Feb. 4, 1964    L. L. SHUMAKER    3,120,088
METHOD FOR TREATING GLASS SHEETS
Filed Nov. 23, 1960    2 Sheets-Sheet 1

INVENTOR.
LYLE L. SHUMAKER
BY
Oscar L. Spencer
ATTORNEY

Feb. 4, 1964 L. L. SHUMAKER 3,120,088
METHOD FOR TREATING GLASS SHEETS
Filed Nov. 23, 1960 2 Sheets-Sheet 2

INVENTOR.
LYLE L. SHUMAKER
BY
Oscar L. Spencer
ATTORNEY

United States Patent Office 3,120,088
Patented Feb. 4, 1964

3,120,088
METHOD FOR TREATING GLASS SHEETS
Lyle L. Shumaker, Natrona Heights, Pa., assignor to Pittsburgh Plate Glass Company, Pittsburgh, Pa., a corporation of Pennsylvania
Filed Nov. 23, 1960, Ser. No. 71,196
2 Claims. (Cl. 51—283)

This invention relates to a method for treating glass sheets and more especially relates to a method of treating one of two glass sheets which, after bending together as a doublet, are used with a plastic interlayer to form a bonded glass-plastic-glass curved laminate useful as a windshield for a vehicle such as an automobile.

Curved windshields are used in modern vehicles such as automobiles. These windshields comprise two substantially matching curved glass sheets with a plastic interlayer bonded to both glass sheets. The interlayer is customarily a sheet of plasticized thermoplastic material such as plasticized Vinal. The thermoplastic material is bonded to the two glass sheets by the application of heat and pressure. A method of bonding a plasticized thermoplastic sheet to two glass sheets to form the laminated curved windshield is disclosed in U.S. Patent No. 2,984,645, granted to Laurence A. Keim on August 9, 1960.

Prior to bonding the thermoplastic sheet to the pair of matched curved glass sheets the latter sheets are prepared from flat glass sheets which are bent together as a doublet. The two glass sheets forming the doublet are cut to outline and one of the glass sheets is placed on the other. The doublet is placed on a bending mold which is passed through a bending lehr, whereby the two glass sheets are bent. The two glass sheets are bent in the lehr so that each has a central portion which has a gentle curvature about a transverse axis normal to the longitudinal axis of each of the sheets. In the bending lehr each of the two glass sheets of the doublet is bent sharply between the end portions and the central portion about transverse axes that are normal to the longitudinal axes of the sheets. As a result of the bending operation, the end portions extend from the central portion generally in the same direction and substantially parallel to each other. The radius of curvature at the sharply bent portions of the sheets between the end portions and the central portion of each sheet is of the order of 8 to 12 inches.

Because the two glass sheets of the doublet are bent together and because the bent or curved doublet should have their extremities in substantial matching relationship, it is necessary to use, as the doublet, two glass sheets which are of slightly different length. The shorter flat glass sheet cut to outline is placed on the longer glass sheet which is also cut to outline and this doublet is placed on the bending mold. During the bending operation the shorter glass sheet at its ends moves along the upper surface of the bottom glass sheet of the doublet.

After cutting the two glass sheets to outline for the preparation of a doublet to be bent in the preparation of a laminated curved windshield, it is customary to seam the edges of the top and bottom glass sheets along the central portion of these sheets. As described in section K–2, page 8, of the "Glass Manual" published by Pittsburgh Plate Glass Company and copyrighted in 1946, the term "to seam" is to grind off the edge of the face of a plate of glass at a narrow angle. The two sheets that will form the doublet are seamed on both major faces at the edges of the central portion prior to bending of the doublet in order to avoid cutting the hands of individuals handling the sheets when placing them together to form this doublet and placing the doublet on the bending mold. An example of a glass bending mold is disclosed in U.S. Patent No. 2,924,045 granted to Paul Startzell on February 9, 1960.

After the bending operation on the doublet of glass sheets to produce the pair of matched curved glass sheets, glass chips have been found between the two glass sheets at a substantial distance from the tips of the sheets. These glass chips at the temperature of the bending operation tend to become fused to one or both of the glass sheets forming the doublet. This creates an optical defect which can result in failure of the product to meet the optical requirements for windshields. Furthermore, the presence of such glass chips causes difficulties in the laminating or bonding process when a composite assembly including the two glass sheets and a plastic sheet between them is subjected to an elevated pressure and an elevated temperature in a laminating process such as disclosed in said U.S. Patent No. 2,948,645, which is assigned to the assignee of the present patent application.

It has been discovered that the creation of glass chips and their introduction between the glass sheets of a doublet being bent can be substantially minimized and even completely avoided by seaming one face at the tip only of the end portion of the smaller glass sheet of the doublet. When the glass sheets of the doublets are to be bent about transverse axes between the central portion and the end portions, the method includes the seaming at the one face at the tip only of both end portions of the smaller glass sheet. This method is disclosed and claimed in a patent application being filed this date by Robert W. Wheeler, Serial No. 71,282, entitled "Method for Treating Glass Sheets" and assigned to the assignee of the present application.

It is an object of the present invention to provide a method for treating flat elongated glass sheets, to be bent with other glass sheets as doublets while moving the glass sheets in a path for the edge seaming of one face of each of these sheets at the tips of the end portions of these sheets.

These and other objects of the present invention will be apparent to one skilled in the art from the following description of the method and the apparatus of this invention when taken in conjunction with the drawings in which generally identical parts are designated by the same numeral and in which.

Figure 3:
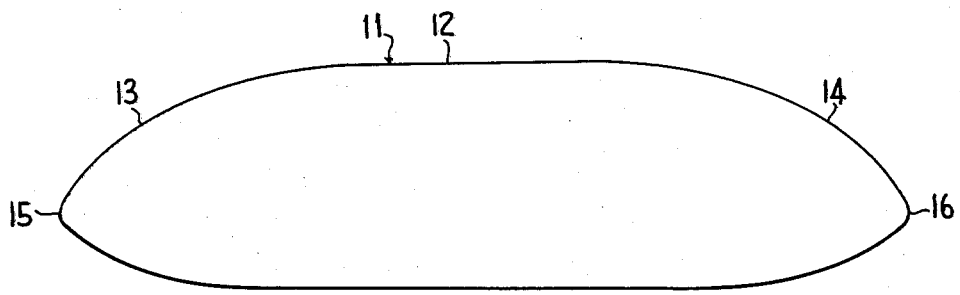
FIG. 3 is a plan of a sheet of flat glass cut to outline.
Figure 4:
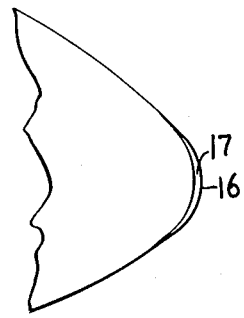
FIG. 4 is a fragmentary plan of the sheet of FIG. 3 after seaming at the tip only of the end portion of the sheet such as shown in FIG. 3.

FIG. 3 shows an illustrative outline of the smaller glass sheet generally indicated at 11. The sheet 11 is elongated and has a central portion 12 and end portions 13 and 14. The sheet 11 has somewhat pointed end portions 13 and 14, i.e., the portions 13 and 14 at the longitudinal extremities of sheet 11 have generally outwardly converging edges to form tips 15 and 16, respectively, narrower than central portion 12. In accordance with the present invention,, one face of sheet 11 at its tips 15 and 16 is seamed to provide seamed surfaces. For tip 16 the seamed surface portion 17, which is obtained, is shown in FIG. 4. A similar seamed surface portion is provided on the same face of sheet 11 at tip 15.

Figure 5:
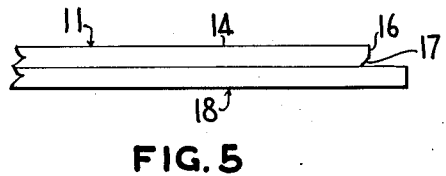
FIG. 5 is a fragmentary elevation of a doublet of flat glass sheets with the sheet of FIG. 4 resting on a longer glass sheet also cut to pattern to provide a doublet for bending.

In the method of Wheeler as described by his application, which is mentioned above, glass sheet 11 of FIG. 4 is inverted and placed on a larger glass sheet, generally indicated at 18, which is also cut to outline generally indicated for sheet 11 in FIG. 3. The sheet 18 at its longitudinal extremities extends beyond sheet 11, i.e., sheet 18 is longer in a longitudinal direction than sheet 11. Because sheet 11 is inverted, the seamed surface portion 17 faces the top surface of sheet 18. The doublet shown in FIG. 5 is placed on a bending mold. When the mold is passed through a bending lehr the flat sheets 11 and 18 are bent. As the bending occurs there is some sliding contact between sheets 11 and 18 at their end portions. There is a change in the relative position of the extremities of sheets 11 and 18 during the bending operation. As a result, the end portions 13 and 14 of sheet 11 slide along sheet 18 but because of the seamed surface portions, such as seamed portion 17, of tips 15 and 16 of sheet 11, the bending of the doublet does not result in glass chips at positions between the sheets in the central portion or the end portions of the sheets.

Figure 7:
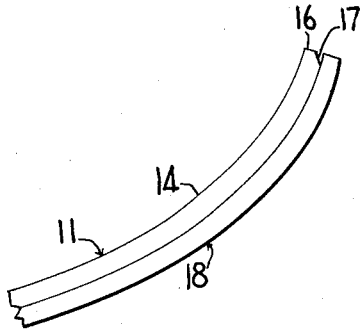
FIG. 7 is a fragmentary elevation showing the doublet after the completion of the bending operation.
Figure 6:
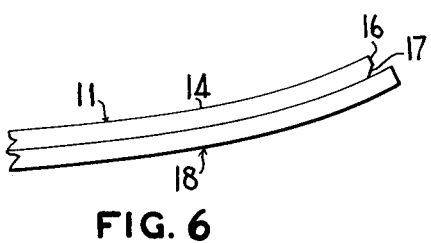
FIG. 6 is a fragmentary elevation showing the doublet of FIG. 5 as it would appear during but prior to the completion of bending operation.

After the doublet has been bent on the mold to produce the curved doublet shown in part in FIG. 7, glass sheets 11 and 18 are separated to place a sheet of plasticized thermoplastic material between them. The air is removed from between the plastic sheet and the glass sheets of the composite assembly. While maintaining a vacuum at the periphery of the composite assembly the assembly is heated to provide a bonding of the plastic sheet to the glass sheets at least at the margin of the assembly. Then the composite assembly at an elevated temperature is subjected to an elevated pressure to complete the bonding of the glass sheets to the thermoplastic sheet. The conditions of elevated temperature and pressure are described in the Keim patent mentioned above.

By carrying out the Wheeler method described above, including the seaming of the tips of the smaller glass sheet at one face and the placing of the smaller glass sheet of the doublet in contact with the larger glass sheet for bending so that the seamed portion of the tips face the larger glass sheet, an improved product from the optical standpoint is obtained and an improved yield of windshields in the elevated pressure treatment for bonding is also obtained.

The width of the seamed portion at the tips 15 and 16 of the smaller glass sheet of the doublet can be as small as about a couple of inches as measured around the tip with the seam extending inwardly, e.g., about 1/32 inch.

The seamed portions of the tips of the smaller glass sheet 11 are provided on the same face of the glass sheet. This face is preferably the "break out" side of the sheet. To cut the glass sheet to an outline as shown in FIG. 3 a larger glass sheet is scored on one face or major surface along a continuous line having the outline shown in FIG. 3. Then the cut is run along the score line to produce sheet 11. The sheet's other face or major surface is customarily referred to as the "break out" side.

The method of the present invention treats a glass sheet to seam one face of the sheet at one or both of its tips by passing the sheet in a horizontal path parallel to its longitudinal axis. To seam both tips of the sheet while moving in this path the leading edge is lifted into engagement with an abrading means, such as an abrasive belt, followed by lowering the leading edge of the sheet to the original horizontal path of movement. The horizontal movement is continued. When the trailing edge arrives at a position below the abrasive belt, the trailing edge is brought up into engagement with the abrading means to provide a seaming of the trailing edge while continuing the movement of the leading edge of the sheet in the horizontal path. By this method both the leading edge and the trailing edge of the glass sheet cut to outline are seamed on one face at the tips only of the end portions of the sheet.

The apparatus of the present invention, which can be utilized to carry out this method, includes conveyor means to support a glass sheet and to move it in a horizontal path in one direction through a seaming station. The apparatus further includes sheet-lifting means, such as a roller, and means to move the sheet-lifting means between a lowered position below the path of movement to the sheet afforded by the conveyor means and a raised position substantially above the path of movement of the sheet provided by the conveyor means. The apparatus also includes an abrading means, such as an abrasive belt, and means to move the abrading means. When the abrading means is a belt, the moving means moves the belt to provide a bottom run in a cyclical path with the bottom run above the roller and the conveyor means.

The apparatus has means to detect the presence of the leading edge of a glass sheet on a conveyor means at a position of its travel beyond the sheet-lifting means. The detecting means actuates the means to move the sheet-lifting means from the lowered position to the raised position whereby the leading portion of the glass sheet is lifted from the conveyor means to bring the leading tip of the glass sheet into contact with the abrading means, e.g., the abrasive belt, for seaming one face of the sheet at the leading tip.

The apparatus has a sheet-sensing means mounted to indicate the passage of the glass sheet on the conveyor means beyond a station slightly ahead of the location of the roll. The means sensing the passage of the trailing edge of the sheet actuates the means to move the sheet-lifting means from the lowered position to the raised position as soon as the trailing edge or tip of the sheet has passed beyond this sensing means. When this occurs the trailing tip of the glass sheet is lifted into contact with the abrading means whereby the trailing tip of the trailing end portion has its top face seamed.

The apparatus is also provided with means to move the roller from the raised position to the lowered position shortly after the actuation of the means to move the sheet-lifting means from the lowered position to the raised position so that the contact of the leading tip or the trailing tip, as the case may be, against the abrasive belt is of relatively short duration but sufficient to provide the seaming action.

Figure 1:
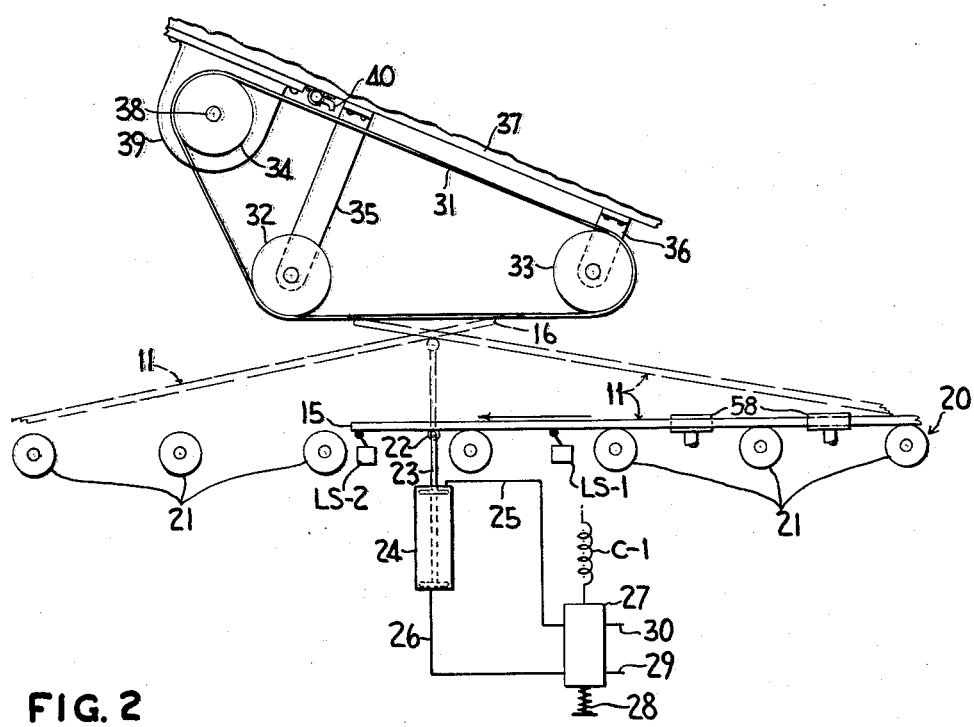
FIG. 1 is an elevation, partially schematic, of a preferred embodiment of the apparatus of the present invention.

Referring to FIG. 1, the apparatus of the preferred embodiment has a conveyor generally indicated at 20 having conveyor rolls 21 which are rotatably mounted on pillow blocks (not shown). The conveyor rolls 21 are driven by a sprocket and chain arrangement (not shown) which is driven by a motor (not shown). The conveyor rolls 21 provide a conveyor means to support glass sheet 11 and to move sheet 11 in a horizontal path. The sheet 11 is moved by conveyor 20 from right to left (as viewed in FIG. 1) and sheet 11 also placed on conveyor 20 so that the movement afforded by conveyor 20 is in a direction parallel to the longitudinal axis of sheet 11. Thus, tip 15 of sheet 11 is the leading edge of sheet 11 and tip 16 is the trailing edge of sheet 11 when moved on conveyor 20.

In a vertical plane normal to the path of travel of sheet 11 a roller 22 is rotatably mounted on a piston rod 23 of an air cylinder 24. The roller 22 is rotatable about a horizontal axis normal to the path of travel provided to sheet 11 by conveyor 20. Pipes 25 and 26 are connected to the upper and lower chambers, respectively, of cylinder 24. The pipes 25 and 26 are connected to two outlets of a 4-way valve 27 which has its spool (not shown) urged in one direction by a spring 28. The spool is moved to its other position by a solenoid or coil C–1 when the latter is energized. The third outlet of valve 27 is connected to an exhaust pipe 29 that is open to the atmosphere. The valve 27 has its inlet connected to a pipe 30 which is connected to a pressurized air source (not shown).

When solenoid C–1 is not energized, the spool of valve 27 is at the position determined by spring 28 so that pipe 30 is in communication with pipe 25 to communicate the upper chamber of air cylinder 24 with the pressurized air source and the lower chamber of air cylinder 24 is connected to the atmosphere through pipes 26 and 29 that are connected to each other through valve 27. With this arrangement piston rod 23 is in the retracted position so that roller 22 is in the lowered position shown in full lines in FIG. 1. In the lowered position roller 22 is below the path of travel of sheet 11 afforded by conveyor 20. When solenoid C–1 is energized, it moves the spool of valve 27 to its other position so that the lower chamber of air cylinder 24 is connected through pipes 26 and 30 to the pressurized air source and the upper chamber of air cylinder 24 is connected to the atmosphere through pipes 25 and 29. In this case piston rod 23 is extended so that roller 22 is in the raised position shown by phantom lines in FIG. 1.

For the seaming of one face of sheet 11 at the leading and trailing tips the apparatus further includes an abrasive belt 31 mounted on idle pulleys 32 and 33 and driven pulley 34. The pulleys 32 and 33 are rotatably mounted on brackets 35 and 36, respectively, which are mounted on a bridge 37. The pulley 34 is mounted on a shaft 38 of a motor 39 which is mounted on bridge 37 which is mounted at its ends on a supporting structure (not shown). At the bottom run of belt 31 the abrasive side of belt 31 faces downwardly.

The pulleys 32, 33 and 34 are located on bridge 37 so that the bottom run of belt 31 is spaced above the horizontal path of travel of tips 15 and 16 of sheet 11 on conveyor 20, but when roller 22 is moved to its raised position by the extension of piston rod 23, the leading tip 15 of sheet 11 is raised to seam the top face of sheet 11 at the tip. This raised position of sheet 11 is shown in the right-hand phantom line view of sheet 11. Of course, this positioning of the bottom run of belt 31 also provides the contact of the top face of sheet 11 at the trailing tip 16 of the trailing end portion 14 of sheet 11 when the latter is lifted by raised roller 22 as shown by the other phantom line view depicting raised sheet 11.

The belt 31 is driven by motor 39 so that the bottom run of belt 31 is in a direction opposite to the direction of movement of sheet 11 afforded by conveyor 20. The abrasive belt 31 in its top inclined run receives water from a pipe 40 mounted on bridge 37 so that the abrading action is provided in the presence of water.

The apparatus has two limit switches designated LS–1 and LS–2 which are located in transverse vertical planes on opposite sides of the transverse vertical plane at which roller 22 is located. The switches LS–1 and LS–2 are mounted on the supporting structure (not shown) so that they are tripped by glass sheet 11 being moved in a horizontal path by conveyor 20. The switch LS–1 is tripped first by the leading tip 15 of sheet 11. This occurs before the leading tip 15 reaches the vertical plane at which roller 22 is mounted. After the leading tip 15 of sheet 11 passes beyond the vertical plane containing roller 22, it trips switch LS–2. The switch LS–1 has a normally closed contact whereas switch LS–2 has a normally opened contact. Thus, switch LS–1 is tripped open by sheet 11 and closes only when trailing tip 16 passes beyond it. Also switch LS–2 is open until tip 15 of sheet 11 closes it. The switch LS–2 is then closed and remains closed until the trailing tip 16 passes beyond switch LS–2 when the latter opens.

Figure 2:
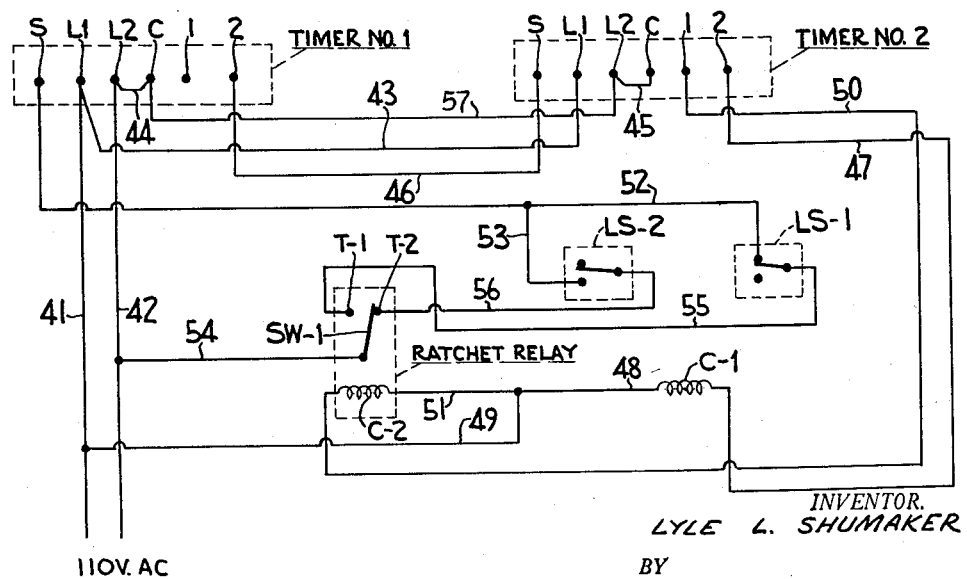
FIG. 2 is a schematic view of the electrical circuitry used in the apparatus of the preferred embodiment.

Referring to FIG. 2, switches LS–1 and LS–2 are connected in parallel to a switch S of a timer No. 1 and to different terminals T–1 and T–2 of a ratchet relay having a switch SW–1 and a coil C–2. The switch SW–1 is in electrical contact with either terminal T–1 or T–2. In FIG. 2 switch SW–1 is shown in contact with terminal T–2. When coil C–2 is energized, this moves switch SW–1 away from contact with terminal T–2 and into contact with terminal T–2 where it will remain until coil C–2 is again energized. The latter energization moves switch SW–1 back to the position shown in FIG. 1.

The timer No. 1 in addition to having switch S includes terminals L1 and L2 which are connected by electrical lines 41 and 42 to a 110-volt A.C. power source (not shown). The timer No. 1 in the preferred embodiment is a synchronous motor-driven electro-mechanical actuating system for automatically opening and closing electrical contacts. A suitable timer is ATC Series 2800 timer made by Automatic Timing and Controls, Inc., King of Prussia, Pennsylvania, and shown in the Operating Instructions pamphlet designated IN–11A. The apparatus also has a timer No. 2 which is of the same type. The switch S of timer No. 1 must be energized to start the timer and the same is true for the switch S of timer No. 2 to start the latter timer. The terminals L1 of timers No. 1 and No. 2 are electrically connected by line 43. Each timer has a control, designated C, which is connected to the terminal L2 for timer No. 1 by an electrical line 44 and in the case of No. 2 it is connected to terminal L2 of that timer by a line 45. Control C of timer No. 1 is connected with terminal L2 of timer No. 2 by a line 57. Each timer has electrical contacts 1 and 2.

The timers can be set up for different arrangements. In the case of timer No. 1 the arrangement is such that when switch S of timer No. 1 is energized, as described below, contact 2 of timer No. 1 is closed for a few seconds and then resets itself. During the operation of timer No. 1 contact 2 of timer No. 1 closes to provide through a line 46 energization of switch S of timer No. 2. The timer No. 2 is arranged so that its contact 2 is closed for a few seconds, then opens, following which contact 1 closes for a period of time after which timer No. 2 resets itself. The automatic resetting of timer No. 1 occurs about the same time as the resetting of timer No. 2.

The contact 2 of timer No. 2 is connected by a line 47 to solenoid C–1 which is connected by lines 48 and 49 to electrical line 41. The contact 1 of timer No. 2 is connected by an electrical line 50 to coil C–2 which is connected through a line 51 and through line 49 to line 41. The switch S of timer No. 1 is connected by switch LS–1 to electrical line 52. The switch LS–2 is connected by a line 53 which is connected to switch S of timer No. 1 to line 52. The switch SW–1 of the ratchet relay is connected to electrical line 42 by a line 54. The switch LS–1 is connected to terminal T–1 of the ratchet relay by a line 55 and switch LS–2 is connected to terminal T–2 by a line 56.

*Operation*

For the purpose of the following description of operation of the apparatus, it is assumed that initially switch SW–1 is in the position shown in FIG. 2 where it is in contact with terminal T–2. The glass sheet 11 is moving on conveyor 20 from right to left (as viewed in FIG. 1) and tip 15 is to the right of switch LS–1. As the movement of sheet 11 continues, switch LS–1 is tripped to open its contact. Of course, when switch LS–1 was previously closed, it could not energize switch S of timer No. 1 because switch SW–1 was not contacting terminal T–1.

The conveyor 20 continues the movement of sheet 11 until tip 15 trips switch LS–2 to close its contact. This results in a closed circuit through line 54, switch SW–1, terminal T–2, line 56, switch LS–2, lines 53 and 52 to energize switch S of timer No. 1. This starts the operation of timer No. 1 to close contact 2 of that timer whereby switch S of timer No. 2 is energized. This starts timer No. 2 to close its contact 2 for the energization of coil C–1 for a few seconds resulting in the operation of valve 27 to operate air cylinder 24 for the raising of roller 22. This lifts the leading end portion 13 of sheet 11 to place the top face of sheet 11 at tip 15 into contact with belt 31 to provide the seaming action.

After a few seconds, contact 2 of timer No. 2 opens to deenergize coil C–1 whereby roller 22 is lowered. This lowers sheet 11 from the inclined position to the horizontal position. The sheet 11 continues to move in the horizontal plane provided by conveyor 20. In the meantime, timer No. 2 closes its contact 1 to energize coil C–2 thereby moving switch SW–1 away from terminal T–2 and into contact with terminal T–1 so that switch LS–2 can no longer energize switch S of timer No. 1. This results in resetting of timer No. 1. At the same time, timer No. 2 is reset because contact 2 of timer No. 1 opens to deenergize switch S of timer No. 2.

When tip 16 of moving sheet 11 passes beyond switch LS–1, the latter closes to energize switch S of timer No. 1 which initiates the operation of timers Nos. 1 and 2, as described above. As a result, roller 22 is raised to lift the trailing end portion 14 of sheet 11 for a few seconds to provide abrading contact of the top face of sheet 11 at tip 16 with belt 31 followed by the lowering of roller 22 to lower sheet 11 to its horizontal position for the continued horizontal movement of sheet 11. Of course, also the closing of contact 1 of timer No. 2 upon the opening of contact 2 of timer No. 2 again energizes coil C–2 to operate the ratchet relay thereby moving switch SW–1 back into contact with terminal T–2. This completes the cycle of operation.

In order to provide proper alignment of the path of travel of sheet 11 with respect to belt 31, guide rollers 58, two of which are schematically shown in FIG. 1, mounted for rotation about vertical axes can be mounted between conveyor rollers 21. These guide rollers will abut the edges of the central portion of sheet 21.

The foregoing description of the preferred embodiment has been presented for purposes of illustration only. The invention is limited only by the claims which follow.

I claim:

1. A method of treating a glass sheet cut to outline and having a central portion and end portions with tips at the outermost longitudinal extremities of the end portions which comprises moving the sheet along a path in a horizontal position in a direction parallel to its longitudinal axis so that one of said tips is a leading tip and the other is a trailing tip, lifting one tip of the sheet into engagement with an abrading means while continuing said movement in said path, and lowering said one tip to the horizontal position along the path of movement while continuing said path of movement, whereby the sheet at its upper major surface is seamed at one of the tips.

2. A method of treating a glass sheet cut to outline and having a central portion and end portions with tips at the outermost longitudinal extremities of the end portions which comprises moving the sheet along a path in a horizontal position in a direction parallel to its longitudinal axis so that one of said tips is a leading tip and the other is a trailing tip, lifting the leading tip of the sheet into engagement with an abrading means while continuing said movement in said path, lowering the leading tip to the horizontal position along the path of movement while continuing said path of movement, lifting the trailing tip into engagement with the abrading means while continuing the movement of the sheet in said path, and lowering the trailing tip of the sheet to the horizontal position along the path of movement while continuing the movement of the sheet in the path, whereby the sheet at its upper major surface is seamed at the leading and trailing tips.

References Cited in the file of this patent

UNITED STATES PATENTS

| | | |
|---|---|---|
| 1,850,465 | Kranich | Mar. 22, 1932 |
| 1,961,487 | Hamann | June 5, 1934 |
| 1,978,149 | Stevenson | Oct. 23, 1934 |
| 2,160,085 | Robertson | May 30, 1939 |
| 2,706,876 | Levengood | Apr. 26, 1955 |
| 2,876,600 | Pendergast | Mar. 10, 1959 |
| 2,910,813 | De Vore | Nov. 3, 1959 |